Patented Aug. 26, 1924.

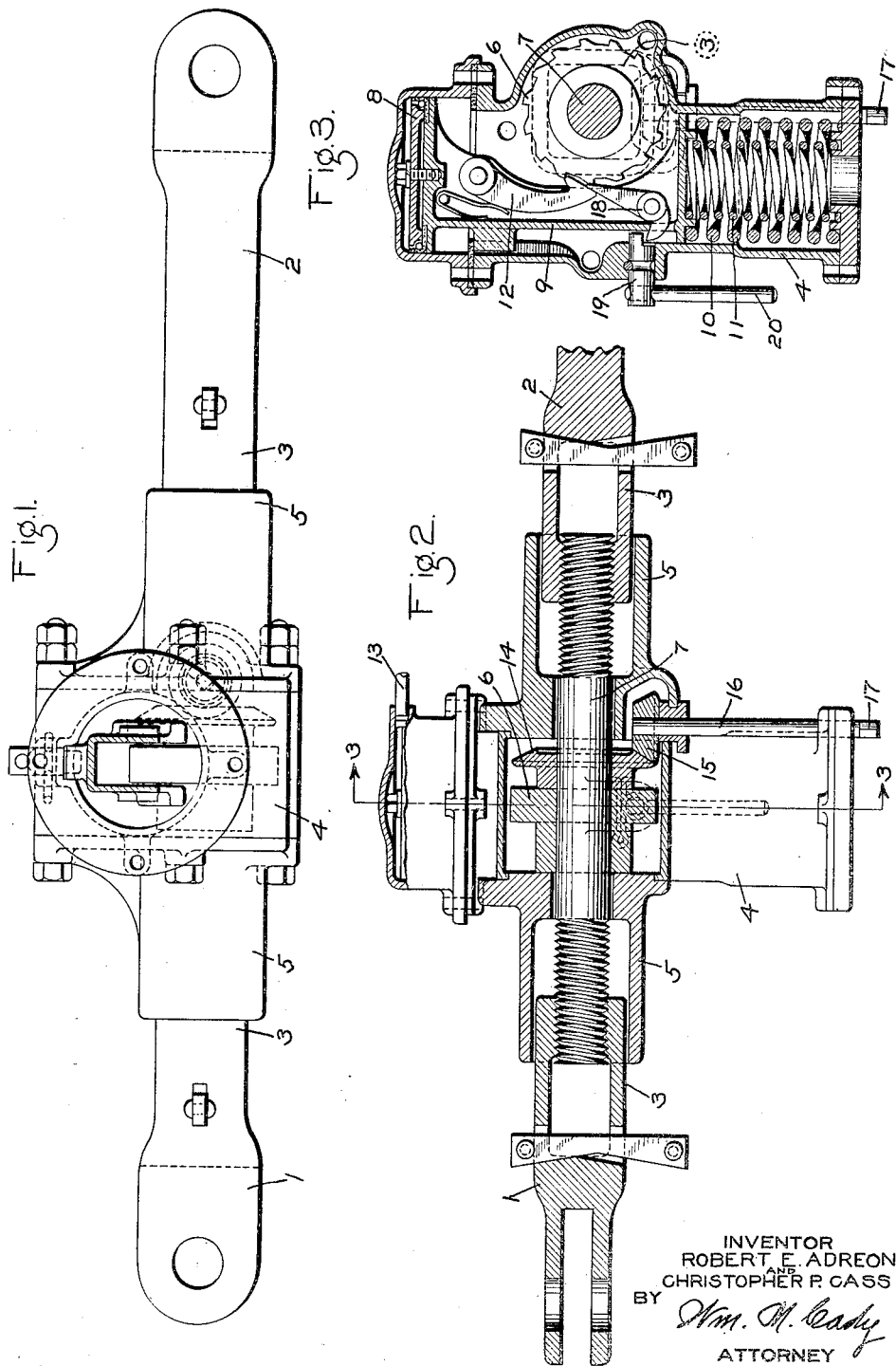

1,505,938

UNITED STATES PATENT OFFICE.

ROBERT E. ADREON, OF ST. LOUIS, MISSOURI, AND CHRISTOPHER P. CASS, OF BERKELEY, CALIFORNIA, ASSIGNORS TO THE AMERICAN BRAKE COMPANY, OF ST. LOUIS, MISSOURI, A CORPORATION OF MISSOURI.

SLACK ADJUSTER.

Application filed July 19, 1922. Serial No. 575,937.

*To all whom it may concern:*

Be it known that we, ROBERT E. ADREON and CHRISTOPHER P. CASS, citizens of the United States, and residents, respectively, of St. Louis, State of Missouri, and Berkeley, in the county of Alameda and State of California, have jointly invented certain new and useful Improvements in Slack Adjusters, of which the following is a specification.

This invention relates to slack adjusters for taking up slack in the brake rigging due to the wear of the brake shoes on the car wheels.

The principal object of our invention is to provide a slack adjuster adapted to be applied to a brake lever tie rod and in which the slack adjusting screw is designed to effect adjustment at opposite ends.

Other objects and advantages will appear in the following more detailed description of the invention.

In the accompanying drawing; Fig. 1 is a plan view of a brake lever tie rod with the improved slack adjuster applied, the cover plate of the take-up cylinder being removed; Fig. 2 a side elevation thereof, partly in section; and Fig. 3 a section on the line 3—3 of Fig. 2.

As shown in the drawing, the construction may comprise jaw castings 1 and 2 adapted to be connected to opposite brake levers and each having a square shank 3. Interposed between the castings 1 and 2 is a take-up cylinder 4 having opposite sleeve portions 5, provided with squared recesses into which the square shanks of the castings 1 and 2 telescope.

Mounted in the take-up cylinder 4 is a ratchet wheel 6 which is secured to the central portion of an adjusting screw 7 having right and left hand screw threads at the opposite ends adapted to engage corresponding screw threads in the jaw castings 1 and 2, so that rotation of the ratchet wheel 6 and the screw 7 causes both castings 1 and 2 to be pulled inwardly.

Mounted in the take-up cylinder 4 is a piston 8 having a stem 9 which extends around the ratchet wheel 6 and serves as an abutment for springs 10 and 11. The stem 9 carries a pawl 12 adapted to engage the teeth of the ratchet wheel 6.

In operation, when the brakes are applied, if the brake cylinder piston travel exceeds the predetermined normal, due to wear of the brake shoes, fluid under pressure will be supplied from the brake cylinder through pipe 13 to piston 8. The piston is then moved and the pawl 12 is shifted to engage a succeeding tooth of the ratchet wheel 6. When the brakes are released, fluid is exhausted from the piston 8, permitting the springs 10 and 11 to shift the stem 9 and thereby cause the pawl 12 to partially rotate the ratchet wheel 6. The adjusting screw 7 is thus rotated and the members 1 and 2 are pulled inwardly toward each other so as to shorten the tie rod and thus take up slack due to the wear of the brake shoes.

In order to provide for resetting the slack adjuster after changing brake shoes, a bevel gear 14 may be provided on the hub of the ratchet wheel 6, which is adapted to mesh with a bevel gear 15. The gear 15 may be operated by means of a stem 16 having a squared end 17 for receiving a handle or wrench.

Pivotally mounted on the stem 9 is a bell crank 18 having one arm adapted to engage the under side of the pawl 12 and the other arm adapted to engage a notched pin 19 which may be rotated by means of a handle 20.

When it is desired to remove the take-up cylinder, the engagement of the bell crank arm with the notched pin 19 prevents the springs 10 and 11 from moving the piston 8 all the way out.

In resetting the slack adjuster after changing brake shoes, the pawl 12 may be released from engagement with the ratchet wheel 6 by operating the handle 20 to rotate the pin 19. The projecting portion of the pin then engages the adjacent arm of the bell crank 18 and the other arm is partially rotated so as to lift the pawl 12 out of engagement with the ratchet wheel and thus permit the rotation of the ratchet wheel 6 in either direction upon manipulation of the stem 16.

Having now described our invention, what we claim as new and desire to secure by Letters Patent, is:—

1. In a slack adjuster, the combination with a unitary take-up cylinder structure, of brake lever tie rod members having sliding non-rotative engagement with portions of said cylinder structures.

2. In a slack adjuster, the combination with a take-up cylinder having opposite sleeve portions provided with recesses, of brake lever tie rod members having sliding non-rotative engagement in said recesses.

3. In a slack adjuster, the combination with a take-up cylinder having opposite sleeve portions provided with squared recesses, of brake lever tie rod members having squared shanks engaging in said recesses.

4. In a slack adjuster, the combination with a take-up cylinder, an adjusting screw, and a ratchet wheel mounted in said cylinder and secured to said screw, of tie rod members having screw-threaded engagement with the opposite ends of said adjusting screw.

5. In a slack adjuster, the combination with a take-up cylinder having opposite sleeve portions provided with recesses, an adjusting screw extending into said recesses, and a ratchet wheel mounted in said cylinder and secured to said screw, of opposite brake lever tie rod members having telescopic engagement in each recess and having screw-threaded engagement with opposite ends of said adjusting screw.

6. In a slack adjuster, the combination with a take-up cylinder, a ratchet wheel mounted therein, and a pawl engaging said wheel, of a gear associated with said ratchet wheel and a manually rotatable gear meshing with the ratchet wheel gear.

7. In a slack adjuster, the combination with a take-up cylinder, a ratchet wheel mounted therein, and a pawl engaging said wheel, of a bell crank having one arm adapted to engage said pawl and manually operated means for operating said bell crank to tilt the pawl out of engagement with the ratchet wheel.

In testimony whereof we have hereunto set our hands.

ROBERT E. ADREON.
CHRISTOPHER P. CASS.